United States Patent
Tam et al.

(10) Patent No.: US 7,242,171 B2
(45) Date of Patent: Jul. 10, 2007

(54) POWER CONVERTER CIRCUIT AND METHOD FOR POWER CONVERSION

(75) Inventors: Simon Tam, Cambridge (GB); Vinayak Agrawal, Ghaziabad (IN)

(73) Assignee: Seiko Epson Corporation, Tokyo (JP)

(*) Notice: Subject to any disclaimer, the term of this patent is extended or adjusted under 35 U.S.C. 154(b) by 321 days.

(21) Appl. No.: 10/896,935

(22) Filed: Jul. 23, 2004

(65) Prior Publication Data
US 2005/0057232 A1 Mar. 17, 2005

(30) Foreign Application Priority Data
Aug. 4, 2003 (GB) .............................. 0318237.5

(51) Int. Cl.
G05F 1/40 (2006.01)
G05F 1/56 (2006.01)
H03F 3/04 (2006.01)

(52) U.S. Cl. ...................................... 323/271; 323/280
(58) Field of Classification Search ................ 323/268, 323/270, 271, 273, 275, 279–282, 285; 330/3, 330/250, 252, 254, 278, 293, 310, 311
See application file for complete search history.

(56) References Cited
U.S. PATENT DOCUMENTS
5,343,170 A * 8/1994 Lee .............................. 331/132
5,847,600 A 12/1998 Brooks et al.
6,541,946 B1 * 4/2003 Chen et al. .................. 323/280
6,717,470 B1 * 4/2004 Bowers ........................ 330/255
6,724,252 B2 * 4/2004 Ngo et al. .................... 330/133

* cited by examiner

Primary Examiner—Matthew V. Nguyen
(74) Attorney, Agent, or Firm—Oliff & Berridge, PLC

(57) ABSTRACT

The present invention provides an improved form of inverter circuit which refines the known conventional circuit to reduce its offset and then uses a combination of this refined circuit and a feedback type power converter to achieve low output offset, very high speed and very high current efficiency. According to a first aspect of the present invention there is provided a voltage converter circuit comprising serially coupled first and second gain stages and switching means arranged between the second gain stage and an output for the converter circuit, the first gain stage having a gain greater than that of the second gain stage, and the second gain stage having a bandwidth greater than that of the first gain stage. According to a second aspect of the present invention there is provided A method of voltage conversion comprising serially coupling first and second gain stages and providing switching means arranged between the second gain stage and an output terminal, selecting the first gain stage to have a gain greater than the second gain stage, and selecting the second gain stage to have a bandwidth greater than that of the first gain stage.

18 Claims, 15 Drawing Sheets

Fig. 1.
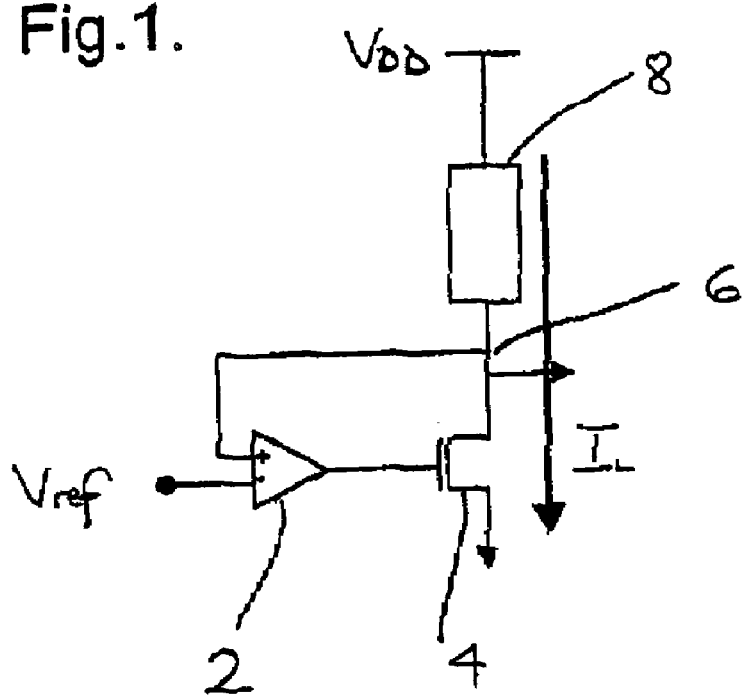
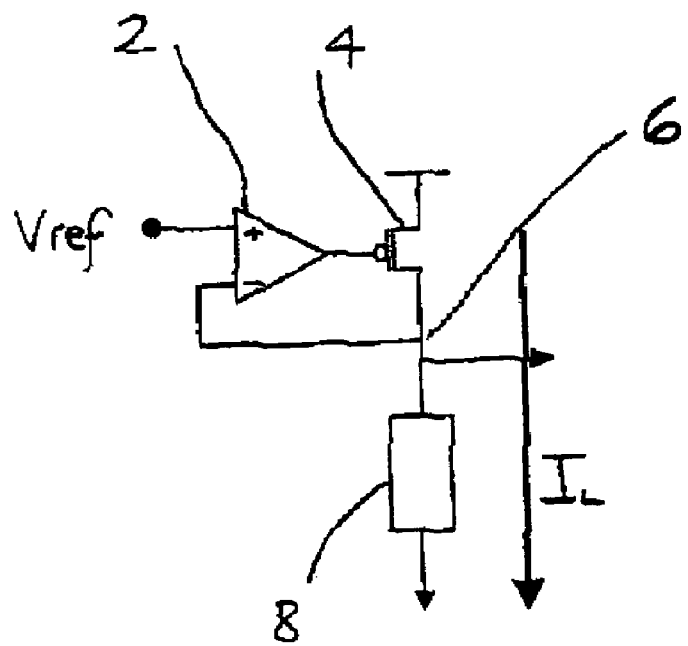
Fig. 2.

Fig. 8a.
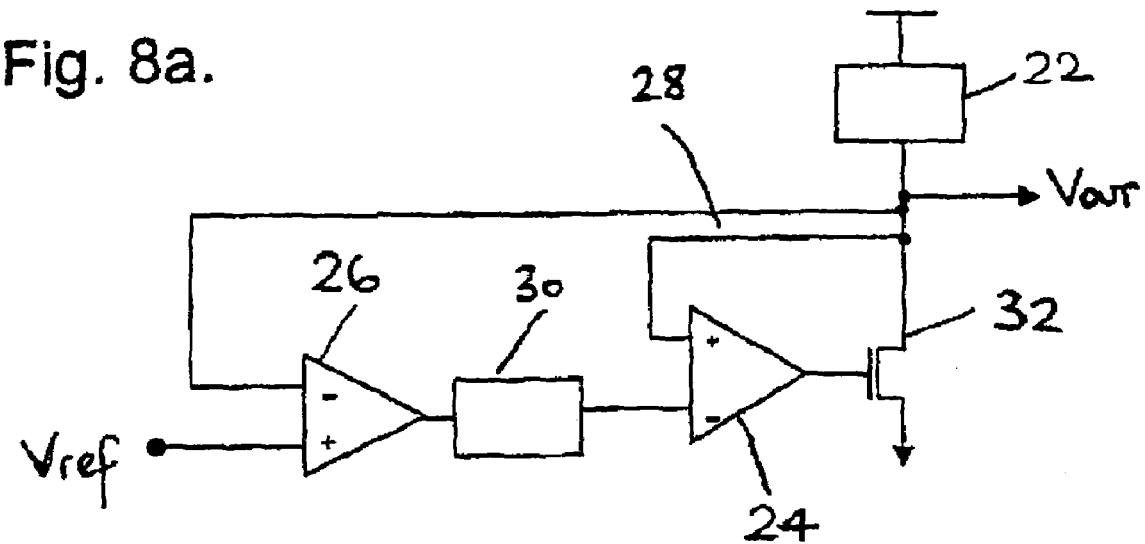
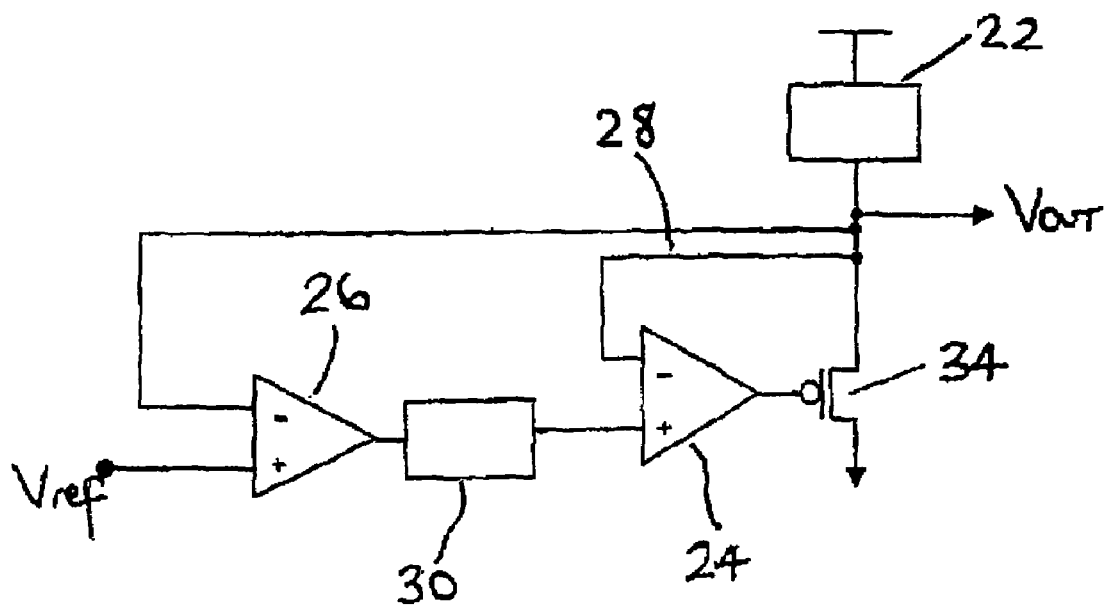
Fig. 8b.

POWER CONVERTER CIRCUIT AND METHOD FOR POWER CONVERSION

The present invention relates to power converter circuits and to a method for power conversion.

On chip power supplies are frequently required in modern integrated circuits (ICs). The ICs often require a variety of supply voltage levels so the on-chip power supplies are usually required to convert a voltage at one level, a relatively high voltage level, to one or more lower voltage levels for use within the IC. The conversion from the high voltage level to the lower voltage levels to be used within the IC is usually carried out using either switching converters which use external components like inductors and capacitors or linear or switching converters which can be fully integrated into the semiconductor IC.

Of the integrated converter options, linear converters are generally preferred because they require fewer circuit components and thus fewer devices need to be incorporated into the IC circuit layout for the voltage conversion process. Hence, linear converters are considered to be better suited for use in ICs designed for portable apparatus applications than are switching converters, even though the latter have better power efficiency.

Linear power converters function by providing an automatically adjustable electrical resistance between the external power supply and the load. The resistance adjusts itself according to the load and output current, so that the voltage at the load terminal remains constant.

If the load draws a current $I_{load}$ from an output voltage of $V_{out}$ from an external power supply then the power dissipation in the load is given by:

$$P_{load} = V_{out} \times I_{load}$$

However the current required to be provided by the external power supply in order to carry out this power conversion function will be $I_{load} + I_{converter}$ where $I_{converter}$ is the current consumption of the linear power converter. Thus the power output required of the external power supply is given by:

$$P_{tot} = V_{dd} \times (I_{load} + I_{converter})$$

The power efficiency of the voltage converter will then be given by:

$$\eta_{power} = P_{load} / P_{tot} = \frac{V_{out} \times I_{load}}{V_{dd} \times (I_{load} + I_{converter})}$$

Since $V_{out}$ is always less than $V_{dd}$ the power efficiency can, therefore, never be 1 (100%), even if the converter current becomes zero. For this reason, the performance of a linear power converter is normally expressed by referring to the "Current efficiency" of the converter as follows:

$$\eta_{current} = I_{load} / I_{tot} = \frac{I_{load}}{I_{load} + I_{converter}}$$

All power converters consume some current in the control part of their circuits and thus the efficiency of the converters is always less than 1.

A typical linear power converter is shown in FIG. 1., which shows an example of a "pull down" converter. In this pull down circuit a differential amplifier 2 acts as a comparator and turns on or off a solid state switch, in the form of a transistor 4, according to whether the voltage at an output node 6 is higher or lower than a reference voltage $V_{ref}$. The transistor 4 is serially coupled with a load 8 to a voltage supply $V_{DD}$. A pull-up version of the same circuit is shown in FIG. 2, and in these circuits the switch is turned on or off according to whether the output voltage is, respectively, lower or higher than the reference voltage.

A less sophisticated pull down linear converter is shown in FIG. 3, which consists of a PMOS transistor 10 serially coupled with a load 12. In this pull down circuit the gate voltage of the PMOS transistor 10 is fixed by a bias that is equal to a reference voltage plus some predefined voltage that is slightly larger than the threshold voltage of the PMOS transistor. Thus, if the voltage at the output node 14 rises so does the source-gate voltage of the PMOS transistor and so does the current being sinked by the PMOS transistor through the load 12. Thus, the PMOS transistor, in essence, functions as a diode. This circuit performs adequately for relatively small variations of the load current $I_L$. However the output resistance of this circuit is large and variable, so as the load current varies, the output voltage has a relatively large and non-linear variation. Therefore, if there is a relatively large variation in the load current, there is an unacceptably large and non-linear variation in the output voltage which is required to be controlled. FIG. 4 shows the pull down version of the same circuit, which uses an NMOS transistor 16 as the switch.

The power converter circuits presently in use also suffer from two additional problems: they have low current efficiency and their response to changes in the load current is usually slow.

The known circuits work sufficiently well if the variation in load current is not large and not very fast. The output resistance of the simpler circuits is large and so they cause a large offset in the voltage at the output if the load current varies too much. This offset can only be reduced by increasing the physical size of the transistor which functions as the diode switch, but this is not considered to be a satisfactory solution because this entails a large area requirement on the IC layout, where space is severely limited and at a premium.

The more complex of the known circuits use amplified feedback to decrease the output resistance without increasing the size of the switch. In this case, the output resistance of the switch is reduced by a factor equal to the gain of the feedback amplifier. However high gain feedback amplifiers cause two additional problems: firstly, since the loop gain of the circuit becomes high, the stability of the circuit is reduced, so to stabilise the circuit some form of compensation is normally required. In turn, this countermeasure reduces the speed of the circuit and, thus, if the load current varies very fast then the circuit cannot cope. Secondly, since the switching transistor is normally large in size, its gate capacitance is also very large. Hence, the feedback amplifier must expend a relatively high amount of current in charging and discharging this gate capacitance whenever the load current changes. This reduces the current efficiency of the circuit.

It is therefore an object of the present invention to provide an improved form of inverter circuit in which the above problems are at least substantially alleviated. The circuit of the present invention refines the known conventional circuit to reduce its offset and then uses a combination of this refined circuit and a feedback type power converter to achieve low output offset, very high speed and very high current efficiency.

According to a first aspect of the present invention there is provided a voltage converter circuit comprising serially coupled first and second gain stages and switching means arranged between the second gain stage and an output for the converter circuit, the first gain stage having a gain greater than that of the second gain stage, and the second gain stage having a bandwidth greater than that of the first gain stage.

According to a second aspect of the present invention there is provided A method of voltage conversion comprising serially coupling first and second gain stages and providing switching means arranged between the second gain stage and an output terminal, selecting the first gain stage to have a gain greater than the second gain stage, and selecting the second gain stage to have a bandwidth greater than that of the first gain stage.

Embodiments of the present invention will now be described by way of further example only and with reference to the accompanying drawings, in which:

FIG. 1 shows a known feedback assisted pull down power converter circuit;

FIG. 2 shows a known feedback assisted pull up power converter circuit;

FIG. 8a shows an example of a pull down converter circuit in accordance with the present invention incorporating an NMOS transistor as a switch;

FIG. 8b shows an example of a pull down converter circuit in accordance with the present invention incorporating a PMOS transistor as a switch;

Figure 3:
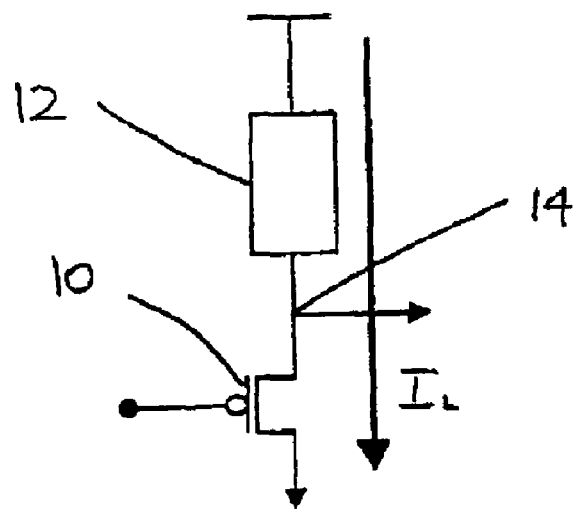
FIG. 3 shows a known PMOS-diode type pull down converter circuit.
Figure 4:
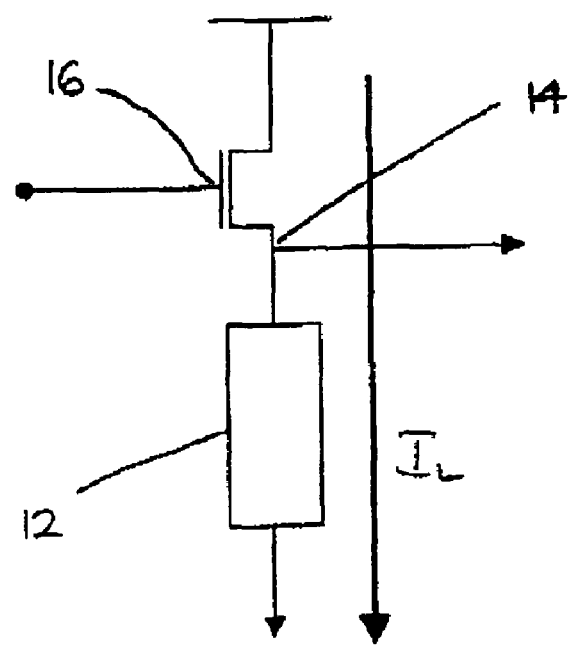
FIG. 4 shows a known NMOS-diode type pull down converter circuit.
Figure 5:
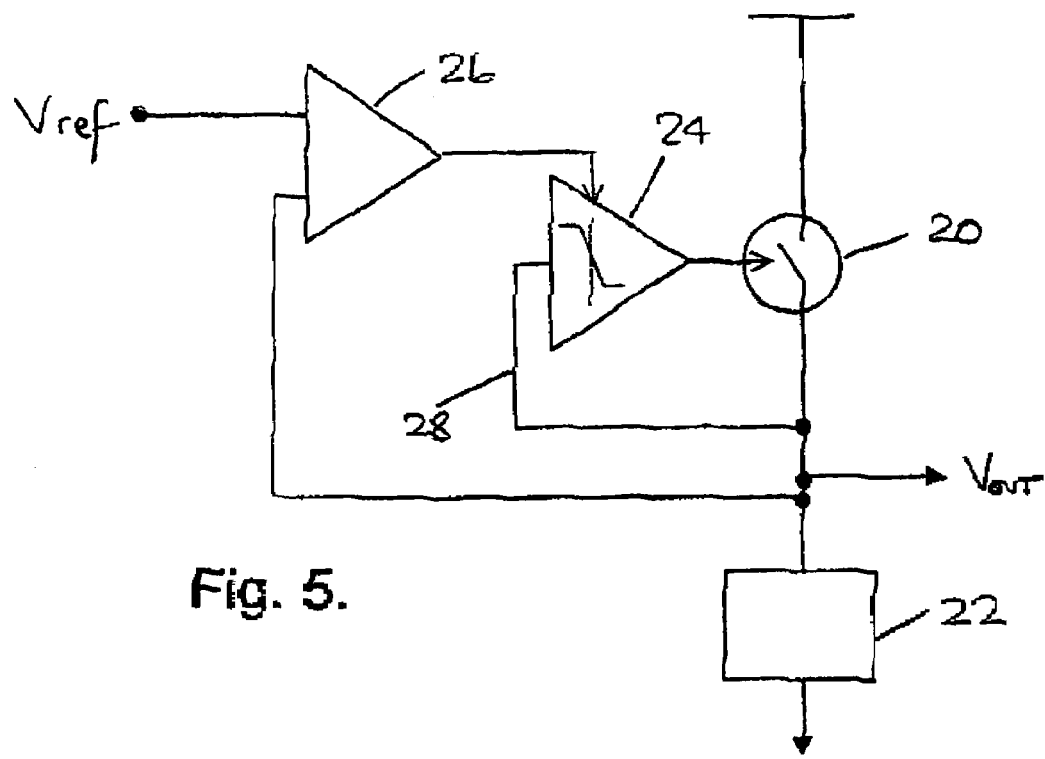
FIG. 5 shows a pull up converter circuit in accordance with the present invention.

FIG. 5 shows the concept of a pull-down power converter circuit according to the present invention. In essence, the circuit can be regarded as comprising a MOS switch 20 that regulates the current through a load 22, a high speed current sensing amplifier 24 that controls the MOS switch 20, and a high gain, relatively slow, feedback amplifier 26 that provides a bias voltage for the current sensing amplifier 24. Hence, the feedback amplifier 26 has a higher gain than the high speed current sensing amplifier 24, but the high speed current sensing amplifier 24, by virtue of its ability to operate at high speed, has a bandwidth greater than that of the relatively low speed feedback amplifier 26. The high speed current sensing amplifier is, in the example shown in FIG. 5, provided with a controllable transfer characteristic.

Every inverting or non-inverting amplifier has an input-output characteristic, which is known as the transfer characteristic and the slope of this characteristic in its central portion provides the gain of the amplifier. If $V_{in}$ is the input voltage and $V_{out}$ is the output voltage of the amplifier, the gain of the amplifier can be defined as:

$$\text{Change in } V_{out}/\text{Change in } V_{in}$$

At either side of the central portion of the characteristic, there will be zero gain if $V_{in}$ is either too low or too high; ie even if $V_{in}$ increases slightly or decreases slightly, $V_{out}$ remains essentially unchanged. The high gain region can be regarded therefore as the central portion of the characteristic.

If an amplifier has a controllable characteristic, it is regarded in this art as having an input-output characteristic which can be shifted by increasing/decreasing (or decreasing/increasing) a control voltage $V_{cont}$.

For a non inverting amplifier, as $V_{cont}$ increases, the transfer characteristic is shifted such that the central high gain portion of the characteristic occurs at higher values of $V_{in}$. Needless to say, for some types of amplifiers the central portion of the characteristic can be shifted to occur at lower values of $V_{in}$.

The same principles also apply for inverting amplifiers but the transfer characteristic is of opposite slope in comparison to that for a non inverting amplifier.

In the embodiment shown in FIG. 5, the high-speed amplifier 24 operates by directly sensing the load current and the voltage at the gate of the switch transistor 20 is increased or decreased according to whether the load current increases or decreases. The switch transistor 20 thus sinks the correct amount of current to the load 22 and prevents the output voltage $V_{out}$ from rising. The current required for the operation of the high-speed amplifier 24 is provided in part by the load current via the link 28. If the minimum load current is more than the current required by the high-speed amplifier 24, then all the current consumption of the high-speed amplifier circuit can be sinked from the load 22, resulting in no net current consumption by the high-speed amplifier part of the circuit, improving overall circuit efficiency.

The bias required to operate the high-speed amplifier 24 is generated adaptively by the very high gain, but relatively slow feedback amplifier 26. This part of the circuit ensures that any offset of the power converter circuit as a whole remains low. If the output voltage $V_{out}$ of the power converter is not equal to the reference voltage $V_{ref}$ as detected by the feedback amplifier 26 which is in the form of a differential amplifier, the bias voltage supplied to the high-speed amplifier is controlled in such a way that the output voltage $V_{out}$ becomes equal to the reference voltage $V_{ref}$. Since the feedback amplifier 26 is very slow in operation, it also performs a long term averaging of the power consumption requirement and adjusts the bias voltage of the high-speed amplifier 24 accordingly to maintain it at the optimum level. Since the amplifier 26 has very low speed, its power consumption can be very small. This means that, when combined with the current required to operate the relatively high speed amplifier 24 being supplied at least in part by the load, the net current consumption of the overall circuit can be extremely small resulting in very high current efficiency for the overall circuit. Also the area requirement of this circuit to be integrated into an IC will be less than that of the circuit in FIG. 1, providing a further advantage over the known forms of linear power converters.

Figure 6:
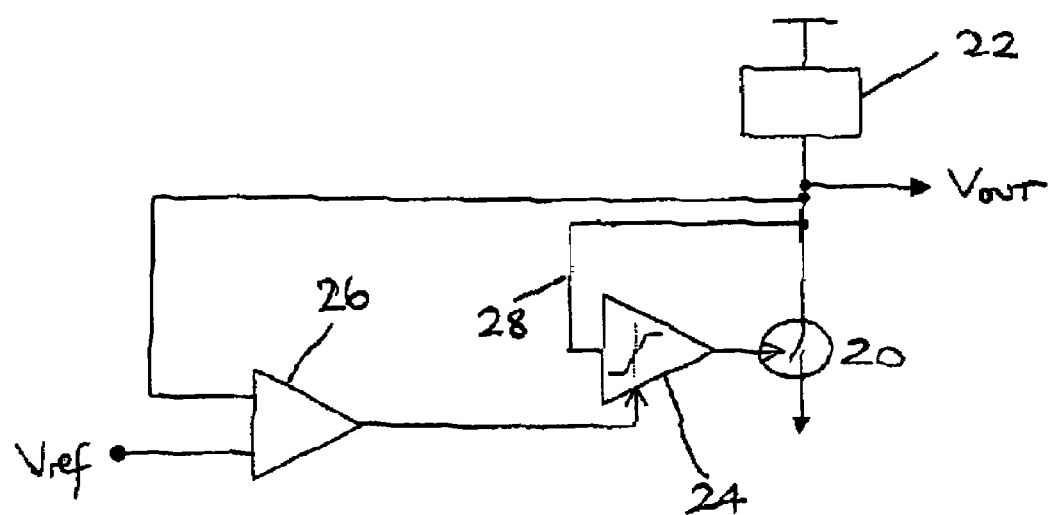
FIG. 6 shows a pull down converter circuit in accordance with the present invention.
Figure 7:
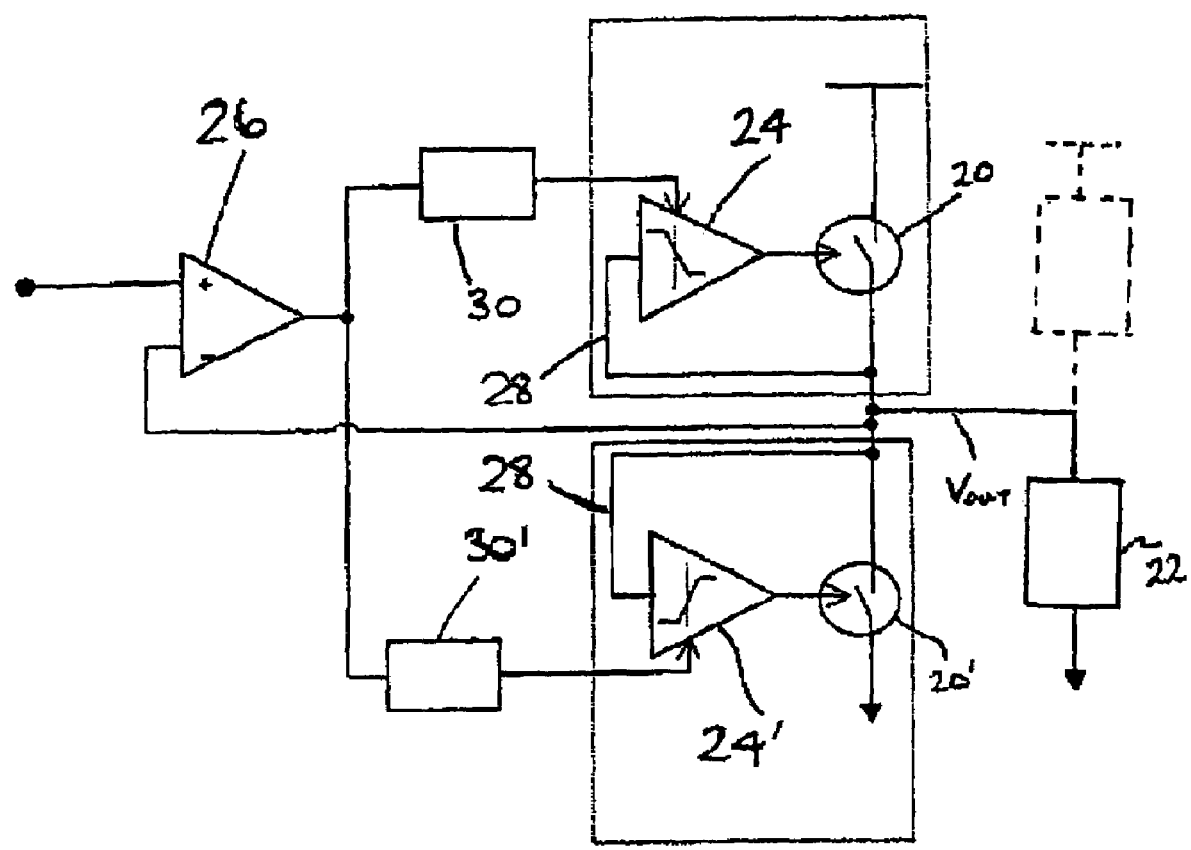
FIG. 7 shows a converter circuit in accordance with the present invention and having a pull up and pull down capability.

FIG. 5 shows a pull up type linear power converter in which the high speed amplifier 24 comprises an inverting amplifier, as shown by the negative slope of the transfer characteristic. However, the principles of the present invention can also be applied to a pull down converter circuit, as shown in FIG. 6 where an non inverting type amplifier is used as the high speed amplifier 24, or a power converter in which a pull up and pull down capability is provided, as shown in FIG. 7. It can be seen from FIG. 7 that the inverting and non inverting amplifiers used for the high speed amplifiers of, respectively, the pull up and pull down parts of the circuit share a common high gain amplifier 26, with respective level shifter circuits 30 provided between the high gain amplifier 26 and the high speed amplifiers 24 to optimise the operation of the high amplifiers 24 on the 'high gain' portions of their transfer characteristics. This sharing of a common high gain amplifier 26 provides further circuit efficiencies in comparison to when individual pull up and pull down converters are used, particularly in the case where the current consumption of the high speed amplifiers can be sourced from the load via the links 28.

FIGS. 8a and 8b are, respectively, examples of implementations of the pull up circuit shown in FIG. 5 and the pull down circuit shown in FIG. 6. In the pull up circuit of FIG. 8a the switch 20 is implemented by an NMOS transistor 32 and in the pull down circuit of FIG. 8b the switch is implemented by a PMOS transistor 34. In each of these circuit examples the high speed amplifier is configured as a high speed differential amplifier and each circuit includes a level shifter circuit to ensure that the high speed amplifiers are operated on the optimum parts of their transfer characteristics.

Figure 9A:
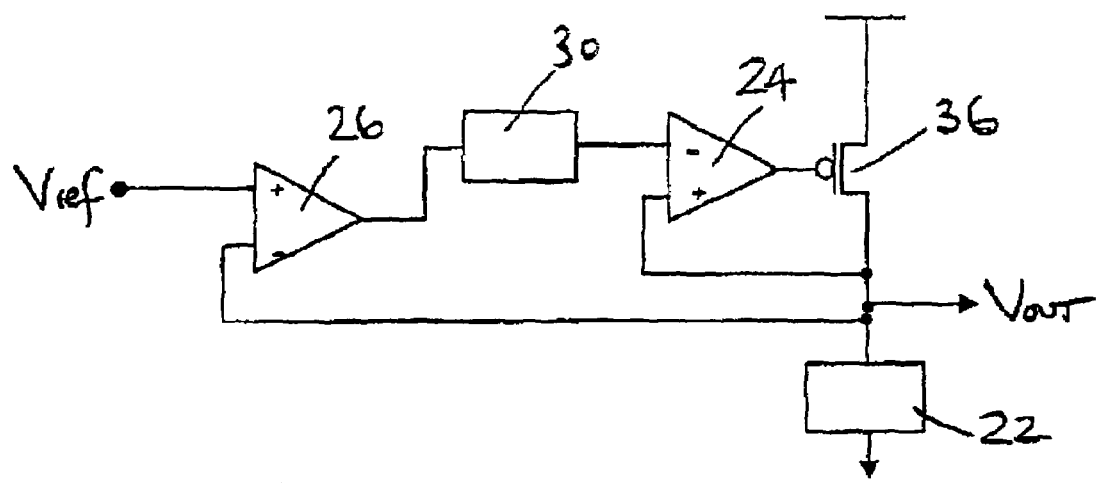
FIG. 9a shows an example of a pull up converter circuit in accordance with the present invention incorporating a PMOS transistor as a switch and a level shifter circuit between the gain stages.
Figure 9B:
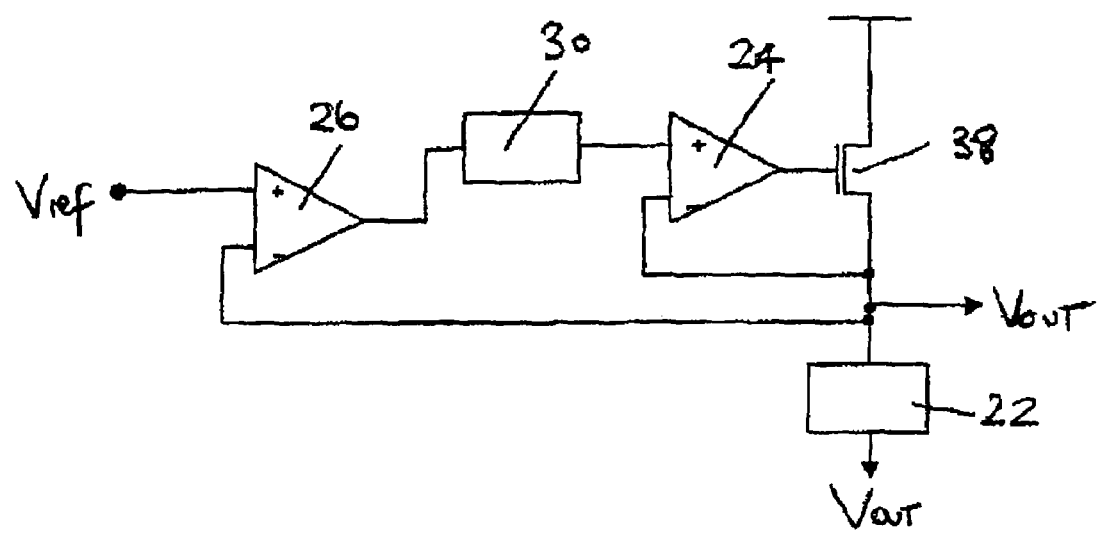
FIG. 9b shows an example of a pull up converter circuit in accordance with the present invention incorporating an NMOS transistor as a switch and a level shifter circuit between the gain stages.

FIG. 9a shows an example of the pull up converter but using a PMOS transistor 36 as the switch and FIG. 9b shows an example of the pull down converter but using an NMOS transistor 38 as the switch. In all other respects the examples shown in FIGS. 9a and 9b are the same as those of FIGS. 8a and 8b, except that the inputs to the high speed amplifier 24 and the high gain amplifier 26 are the inverse to those shown in FIGS. 8a and 8b.

Figure 10A:
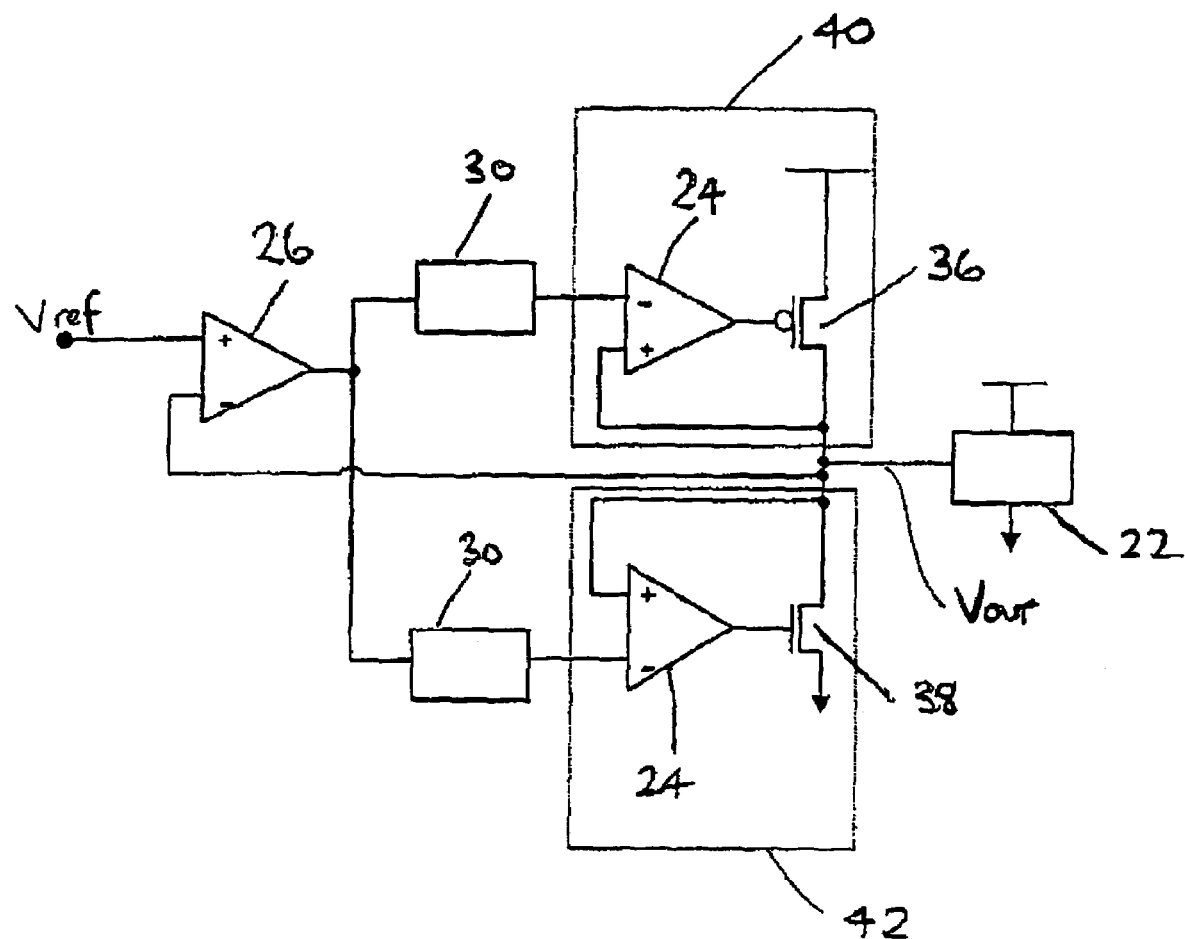
FIG. 10a shows an example of a converter circuit having a pull up and pull down capability with a PMOS transistor as a pull up switch and an NMOS transistor as a pull down switch.

FIG. 10a shows an example of a converter with pull up and pull down capability, in which the PMOS transistor is used as the switch in a pull up part 40 of the circuit and an NMOS transistor is used as a switch in a pull down part 42 of the circuit. In this example, the pull up part 40 and the pull down part 42 of the converter share a common high gain amplifier 26.

Figure 10B:
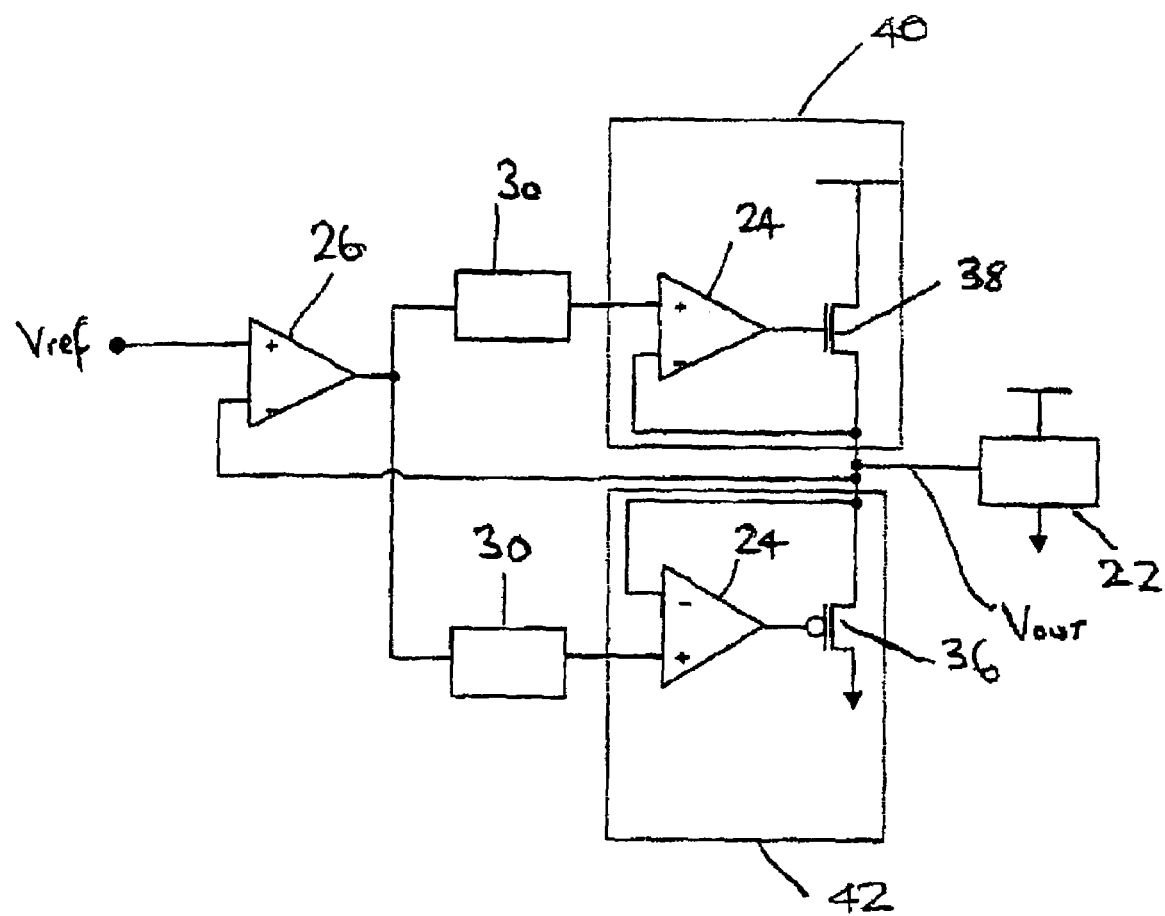
FIG. 10b shows an example of a converter circuit having a pull up and pull down capability with aa NMOS transistor as a pull up switch and a PMOS transistor as a pull down switch.

FIG. 10b also shows an example of a converter with pull up and pull down capability, in which the NMOS transistor is used as the switch in the pull up part 40 of the circuit and the PMOS transistor is used as a switch in the pull down part 42 of the circuit. In this example, the pull up part 40 and the pull down part 42 of the converter also share a common high gain amplifier 26. However, in this example the negative inputs of the differential amplifiers providing the high speed amplifiers 24 are coupled to the output node to the load 22.

Figure 10C:
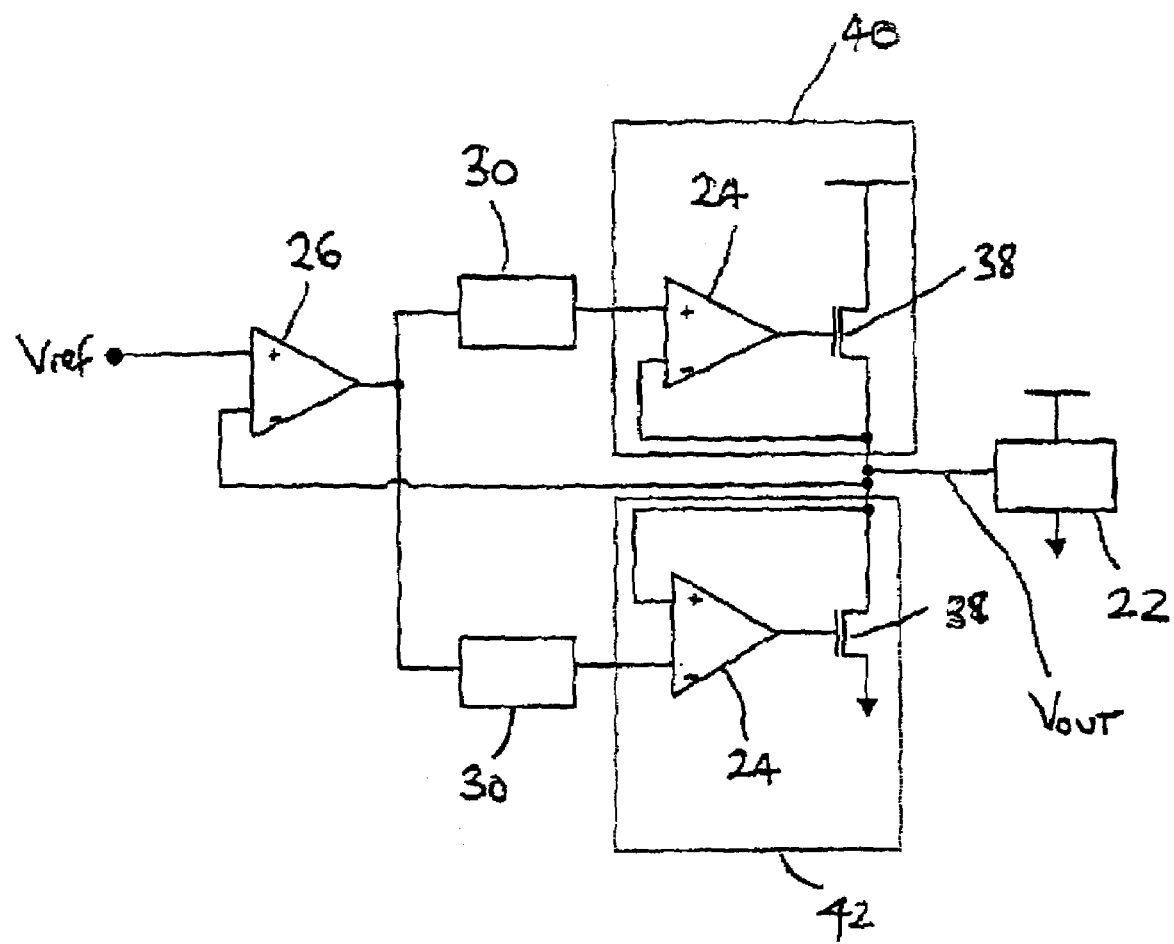
FIG. 10c shows an example of a converter circuit having a pull up and pull down capability with an NMOS transistor as the pull up and pull down switches.

FIG. 10c shows another example of the converter with pull up and pull down capability, in which the NMOS transistor is used as the switch in the pull up part 40 of the circuit and the pull down part 42 of the circuit. In this example, the negative input of the pull up part high speed amplifier and the positive input of the pull down part high speed amplifier are coupled to the node to the load 22.

Figure 10D:
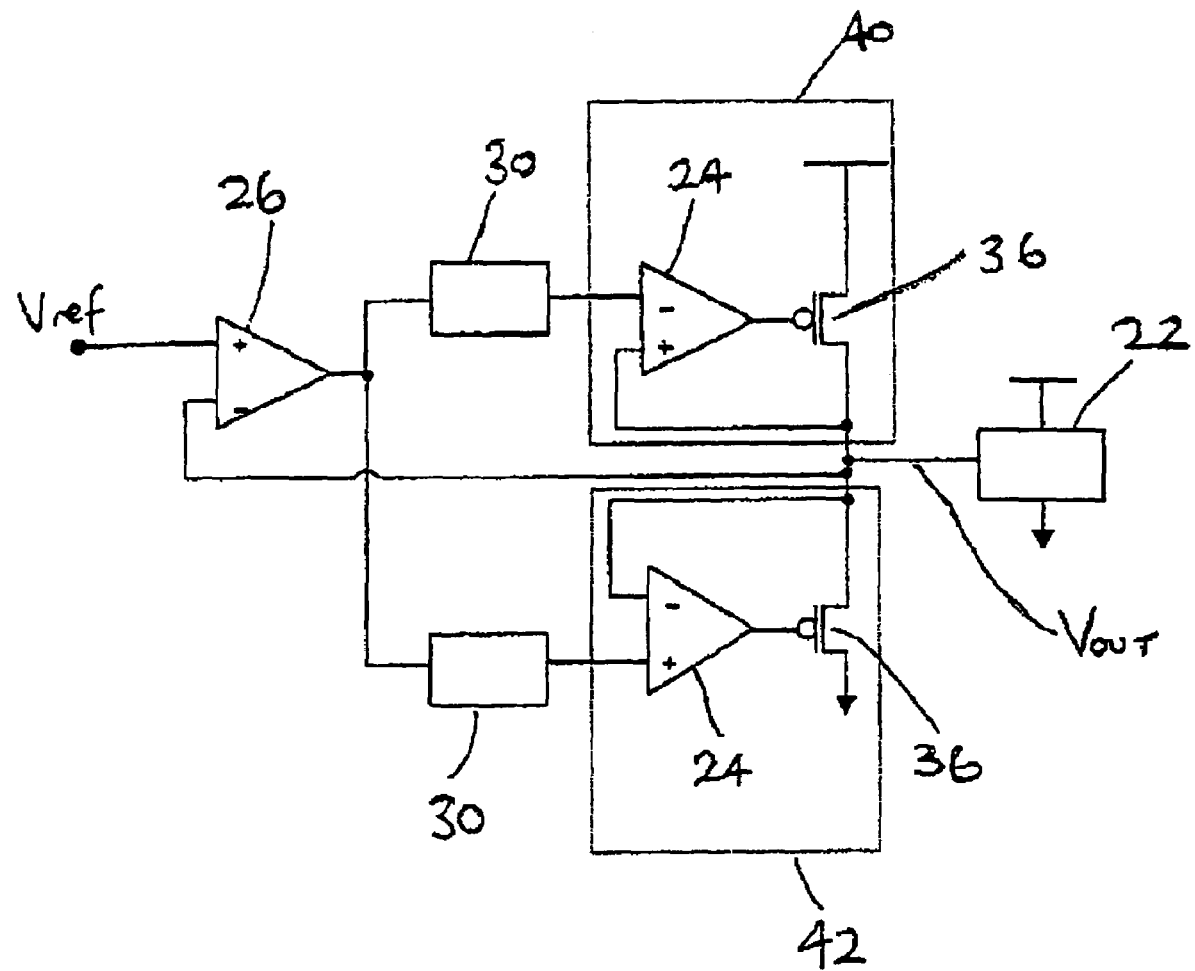
FIG. 10d shows an example of a converter circuit having a pull up and pull down capability with PMOS transistors as the pull up and pull down switches.

FIG. 10d shows a further example of the converter with pull up and pull down capability, in which the PMOS transistor is used as the switch in the pull up part 40 of the circuit and the pull down part 42 of the circuit, with appropriate connection to the positive and negative inputs of the high speed differential amplifiers.

Figure 11:
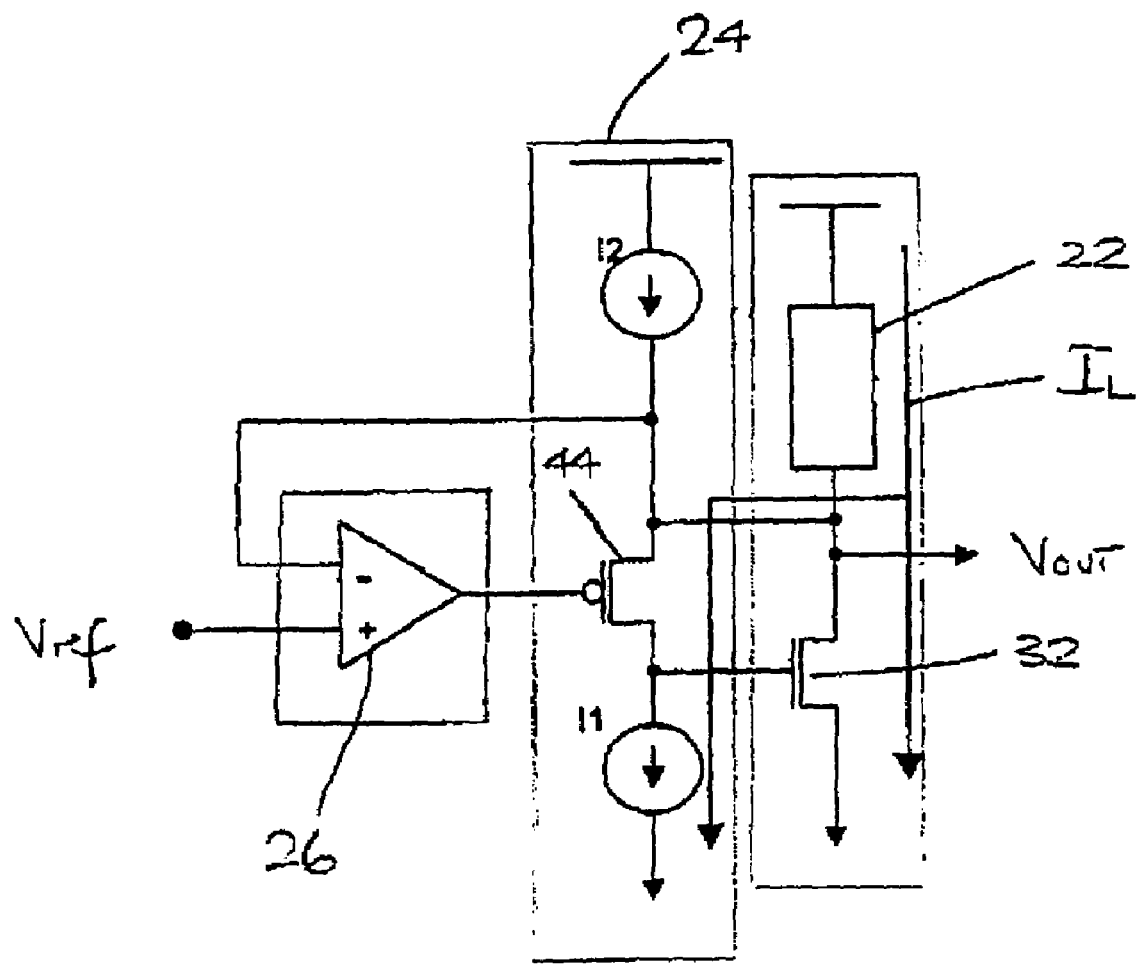
FIG. 11 shows a converter circuit in accordance with the present invention having a pull down capability and high current efficiency.

FIG. 11 shows a practical schematic implementation of the circuit illustrated in FIG. 8a in which the high speed amplifier is provided by a PMOS transistor 44 arranged in series between a current sink I1 and a current source I2. The value of the current from the current source I2 is slightly more than the current sinked by the current sink I1, which is the minimum expected value of the load current $I_L$. This is to ensure proper operation of the high speed amplifier 24 in all conditions. However, in general, it has been found that the minimum expected load current is more than the current provided by the current source I1, so the current sink I2 is not always required. In such a case, the circuit consumes only the current required by the high gain amplifier 26, which is very small because it has a low operational speed. Hence, in such circumstances, the current efficiency of the circuit overall is very high.

Figure 12:
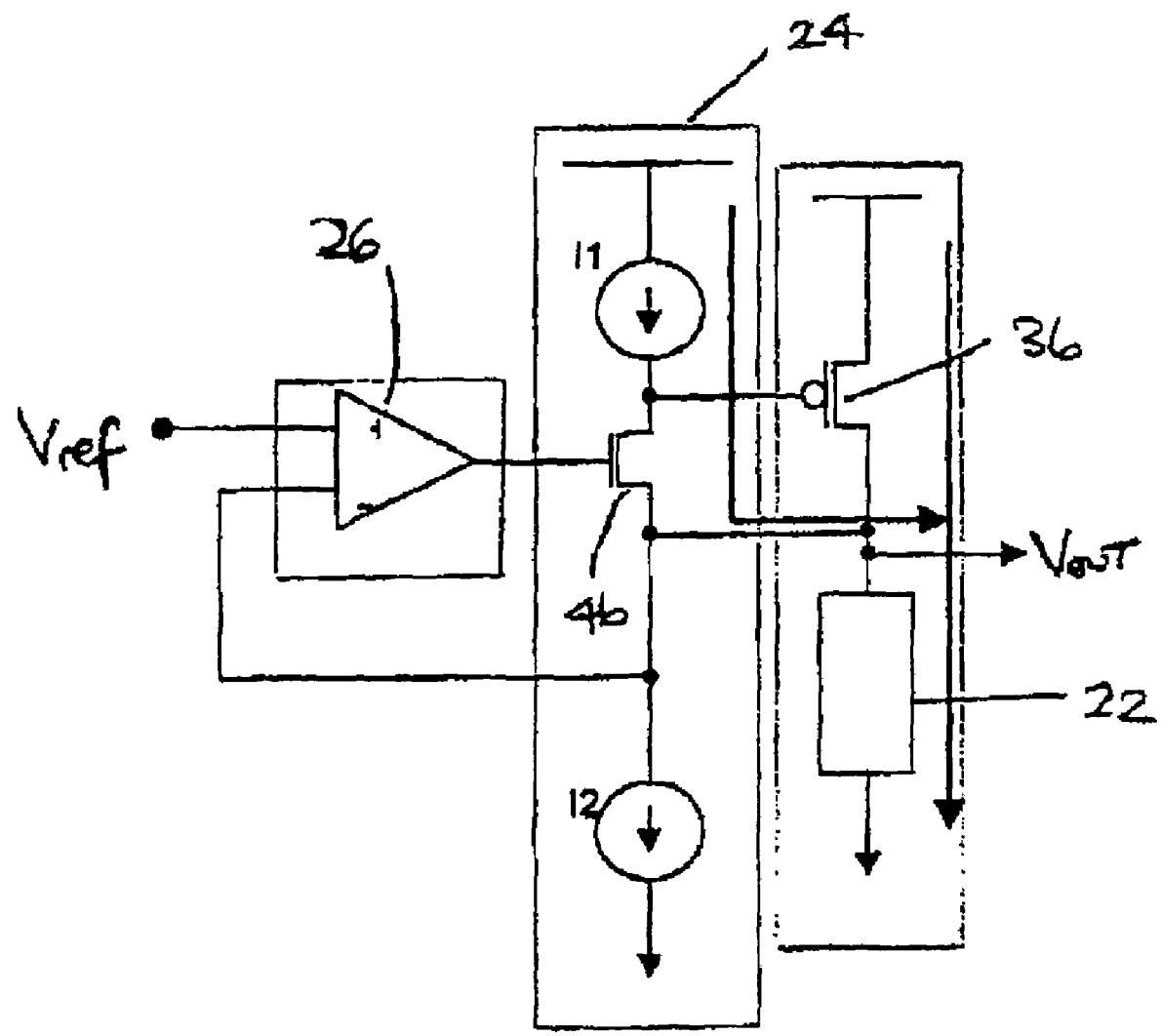
FIG. 12 shows a converter circuit in accordance with the present invention having a pull up capability and high current efficiency.

FIG. 12 shows a practical schematic implementation of the circuit illustrated in FIG. 9a in which the high speed amplifier 24 is provided by a NMOS transistor 46 arranged in series between a current source I1 and a current sink I2. In this example the value of I2 is arranged to be slightly more than I1, which is the expected minimum value of the load current. In common with the circuit shown in FIG. 11, the minimum expected load current is more than I1, so the current cink I2 is not always required. Again, in this circumstance the circuit consumes only the current required by the high gain amplifier 26, which is very small so the overall circuit efficiency is very high.

Figure 13:
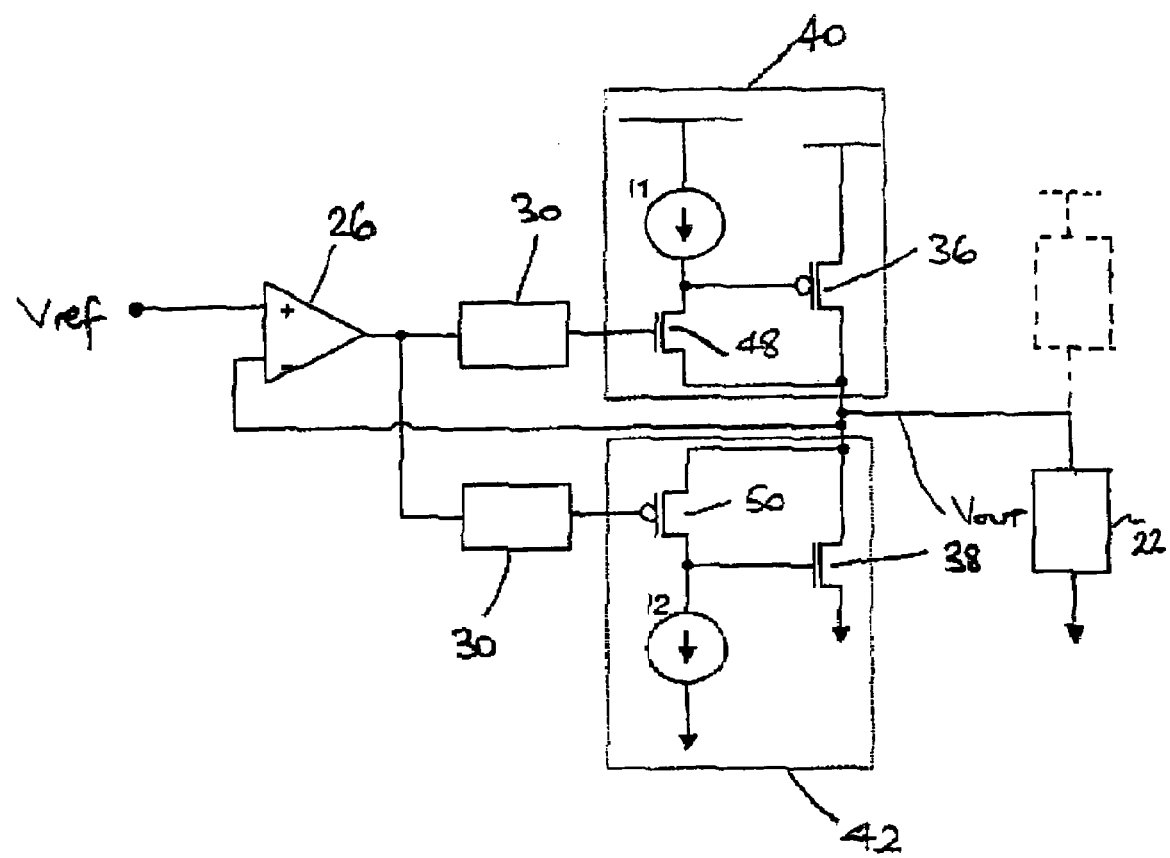
FIG. 13 shows a converter circuit in accordance with the present invention having a pull up and pull down capability and high current efficiency.

FIG. 13 shows a practical schematic implementation of the circuit illustrated in FIG. 10a, which provides a pull up and pull down function. In this example the high speed amplifier of the pull up part of the circuit 40 is provided by an NMOS transistor arranged in series with a current source I1, and the high speed amplifier of the pull down part of the circuit is provided by a PMOS transistor arranged in series with a current sink I2. Unlike the example of the pull down converter shown in FIG. 11 or the pull up converter shown in FIG. 12, the currents from I1 and I2 will continue to flow during any operation of the circuit. This reduces the current efficiency in comparison to the circuits shown in FIGS. 11 and 12, but nevertheless the current efficiency remains very high in comparison to the known converter circuits because both high speed amplifiers 24 share a common high gain feedback amplifier 26 and the values of I1 and I2 are both less than the load current.

Figure 14:
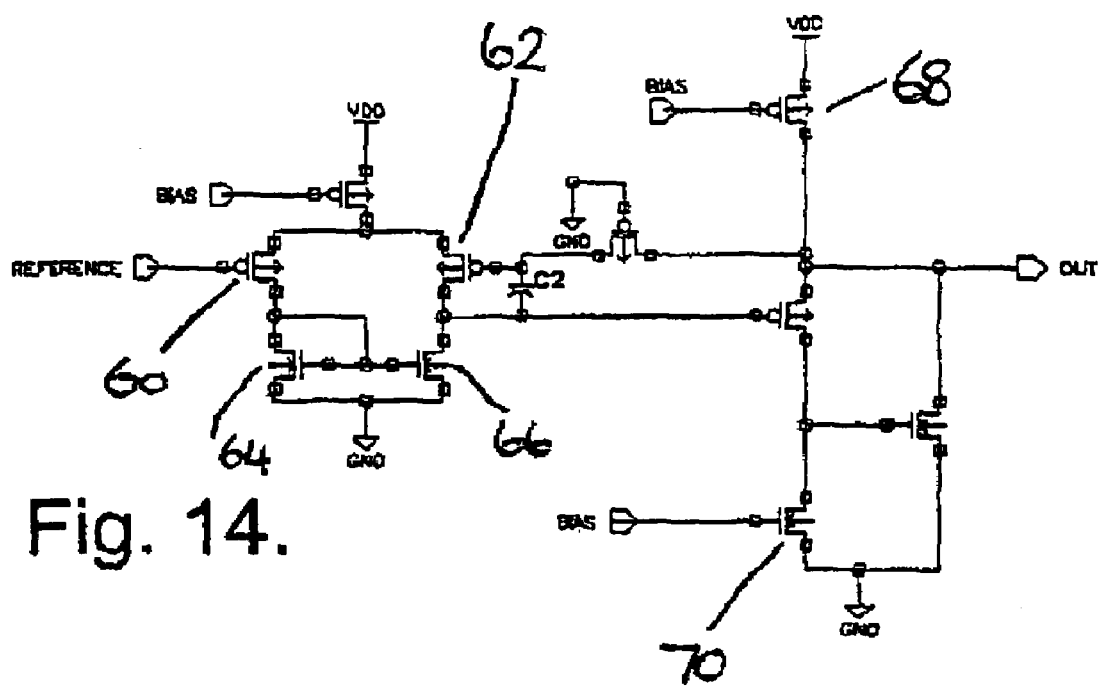
FIG. 14 shows a practical implementation of the circuit illustrated in FIG. 11.

FIG. 14 shows a practical implementation of the pull down converter illustrated in FIG. 11. The high gain feedback amplifier 26 is constituted by a simple differential pair of PMOS transistors 60 and 62 and NMOS transistors 64 and 66, and the current source and current drain for the high speed amplifier 24 are provided by simple PMOS transistor 68 and NMOS transistor 70. In this example the feedback amplifier 26 is stabilised using Miller compensation.

Figure 15:
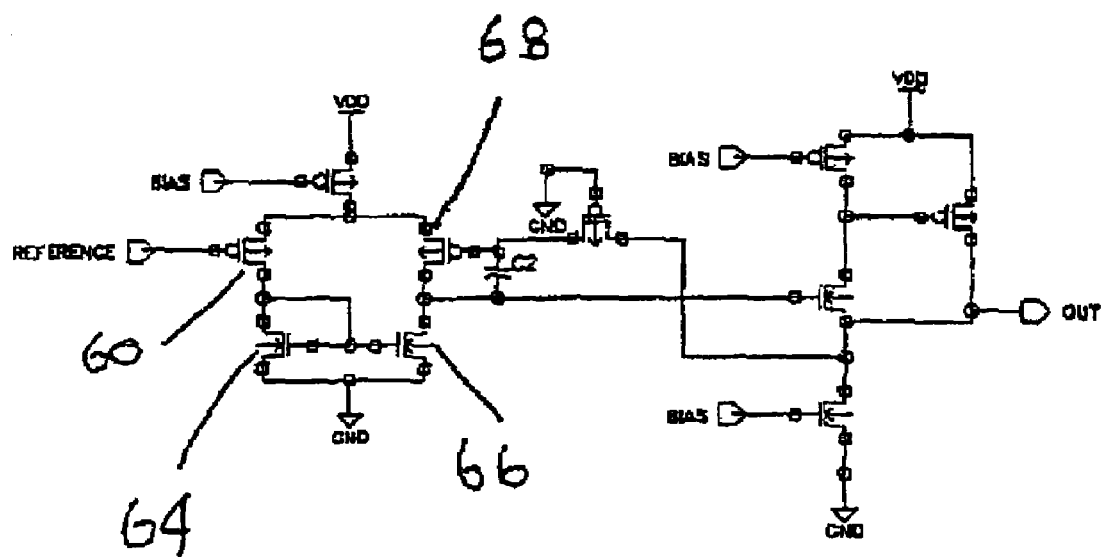
FIG. 15 shows a practical implementation of the circuit illustrated in FIG. 12.

FIG. 15 shows a practical implementation of the pull up converter circuit illustrated in FIG. 12. In common with the circuit shown in FIG. 14, the feedback amplifier is a simple differential pair and the current source and drain for the high speed amplifier are mad of simple PMOS and NMOS transistors.

Figure 16:
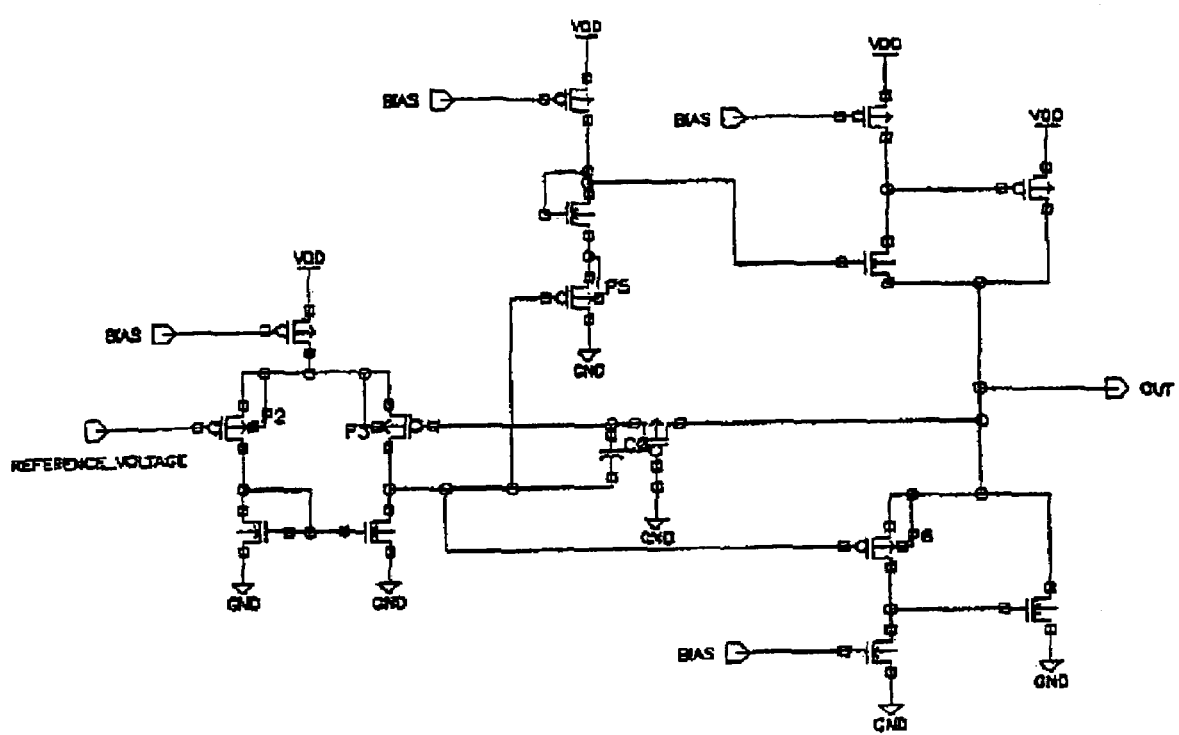
FIG. 16 shows a practical implementation of the converter circuit having a pull up and pull down capability, with a common feedback amplifier for both gain stages and incorporating level shifter circuits.

FIG. 16 shows a practical implementation of the converter circuit illustrated in FIG. 13, with pull up and pull down capability. The high gain feedback amplifier and the high speed amplifiers are fabricated from similar circuit components to the circuits shown in FIGS. 13 and 14. However, in this implementation, the same feedback amplifier is used to control both the pull up and pull down high speed parts of the circuit, with the use of level shifter circuits.

The present invention can be applied to any design of voltage converter, but is particularly suited to applications where the load current variation is very high and very fast. This includes situations where digital switches are required to be controlled by the voltage converter. The converter circuit also provides a very high current efficiency solution for all such situations with a reduced area requirement in the integrated circuit design.

This circuit has a very wide applicability and can be used in applications where a linear power regulator is required. This includes all sorts of embedded IC applications.

The aforegoing description has been given by way of example only and it will be appreciated by a person skilled in the art that modifications can be made without departing from the scope of the present invention.

The invention claimed is:

1. A voltage converter circuit comprising:
   a first gain stage;
   a second gain stage; and
   a first switching means controlled by an output signal outputted from the second gain stage,
   the first gain stage having a gain greater than that of the second gain stage,
   the second gain stage having a bandwidth greater than that of the first gain stage, and
   the second gain stage including a first MOS transistor coupled to a first current source.

2. The converter circuit according to claim 1,
   the first gain stage having a gain determined by the difference between an output voltage of the converter circuit and a reference voltage received by an input of the first gain stage based on an average over a predetermined number of cycles of the output voltage of the converter circuit, and
   the second gain stage having a bandwidth determined based on a maximum instantaneous frequency of the output voltage of the converter circuit.

3. The converter circuit according to claim 1,
   the switching means including a second MOS transistor.

4. The converter circuit according to claim 1,
   the second gain stage further including a second current source, and
   the first MOS transistor being disposed between the first current source and the second current source.

5. The converter circuit according to claim, 4
   each of the first current source and the second current source including CMOS transistors.

6. The converter circuit according to claim 1,
   the first gain stage including a feedback amplifier having a feedback input coupled to the output of the converter circuit.

7. The converter circuit according to claim 1, further comprising:
   a third gain stage; and
   a second switching means,
   the second switching means being arranged between the third gain stage and the output of the converter circuit.

8. The converter circuit according to claim 7,
   the third gain stage including a third MOS transistor, whose conductivity type is opposite to a conductivity type of the first MOS transistor, and
   the second switching means including a fourth transistor whose conductivity type is opposite to a conductivity type of the second MOS transistor.

9. The converter circuit according to claim 7, further comprising:
   a first level shifter coupled between the first gain stage and the second gain stage; and
   a second level shifter circuit coupled between the first gain stage and the third gain stage.

10. A method of voltage conversion by using a converter circuit that includes a first gain stage, a second gain stage and a switching means controlled by an output signal outputted from the second gain stage, the method comprising:
    selecting the first gain stage to have a gain greater than the second gain stage; and
    selecting the second gain stage to have a bandwidth greater than that of the first gain,
    the second gain stage being selected to include a MOS transistor coupled to a first current source.

11. The method according to claim 10
    the first gain stage having a gain determined by the difference between an output voltage of the converter circuit and a reference voltage received by an input of the first gain stage, based on an average over a predetermined number of cycles of the output, voltage of the converter circuit, and
    the second gain stage having a bandwidth determined based on a maximum instantaneous frequency of the output voltage of the converter circuit.

12. The method according to claim 10,
    the switching means being selected to include a second MOS transistor.

13. The method according to claim 10,
    the second gain stage being selected to include a second current source, and
    the first MOS transistor being disposed between the first current source and the second current source.

14. The method according to claim 13
    each of the first current source and the second current source being selected to include CMOS transistors.

15. The method according to claim 10,
    the first gain stage is being selected to include a feedback amplifier having a feedback input coupled to the output of the converter circuit.

16. The method according to claim 10, further comprising:
   providing a third gain stage; and
   providing a second switching means, the second switching means being arranged between the third gain stage and the output of the converter circuit.

17. The method according to claim 16, further comprising:
   selecting the third gain stage to include a third MOS transistor, whose conductivity type is opposite to a conductivity type of the first MOS transistor, and selecting the second switching means to include a fourth transistor, whose conductivity type is opposite to a conductivity type of the second MOS transistor.

18. The method according to claim 16, further comprising:
   providing a first level shifter circuit coupled between the first gain stage and the second gain stage; and
   providing a second level shifter circuit coupled between the first gain stage and the third gain stage.

* * * * *